March 12, 1940. P. C. BEEKMANN 2,193,506
EARTH CONDITIONING IMPLEMENT
Filed Oct. 31, 1938 2 Sheets-Sheet 1

INVENTOR.
P. C. BEEKMANN
BY Maurice J. Fletcher
ATTORNEY.

March 12, 1940.   P. C. BEEKMANN   2,193,506
EARTH CONDITIONING IMPLEMENT
Filed Oct. 31, 1938    2 Sheets-Sheet 2

INVENTOR.
P. C. BEEKMANN
BY Maurice J. Fletcher
ATTORNEY.

Patented Mar. 12, 1940

2,193,506

UNITED STATES PATENT OFFICE 2,193,506

EARTH CONDITIONING IMPLEMENT

Paul C. Beekmann, Atlantic, Iowa

Application October 31, 1938, Serial No. 237,936

4 Claims. (Cl. 97—40)

The principal object of my invention is to provide an earth conditioning implement that will effectively break up lumps of earth or clods in a field.

A further object of my invention is to provide an earth conditioning implement that makes use of a toothed roller for breaking up clods or the like, that is highly mobile, and which exerts a minimum of pull on the pulling means.

A still further object of this invention is to provide an earth conditioning implement for the breaking up of lumps of earth which will automatically compensate itself for various sizes of clods and which will not be damaged by stones or the like.

A still further object of this invention is to provide an earth conditioning implement having a fully adjustable combing bar that may be adjusted to the depth suitable for a particular condition.

A still further object of my invention is to provide an earth conditioning implement that is economical in manufacture, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

It is always necessary in conditioning a field for cultivation, that the ground be level and undesirable lumps or clods be broken up. Generally this has been accomplished by dragging a heavy object over the ground. This is an undesirable method inasmuch as the solid object does not effectively break up the clods and furthermore packs the ground. Also these objects require a great deal of power to pull and are considerable of a nuisance inasmuch as they will not discharge rocks or other foreign matter with which they come in contact. I have overcome such disadvantages as will be apparent and as are hereinafter more fully set forth.

Figure 2:
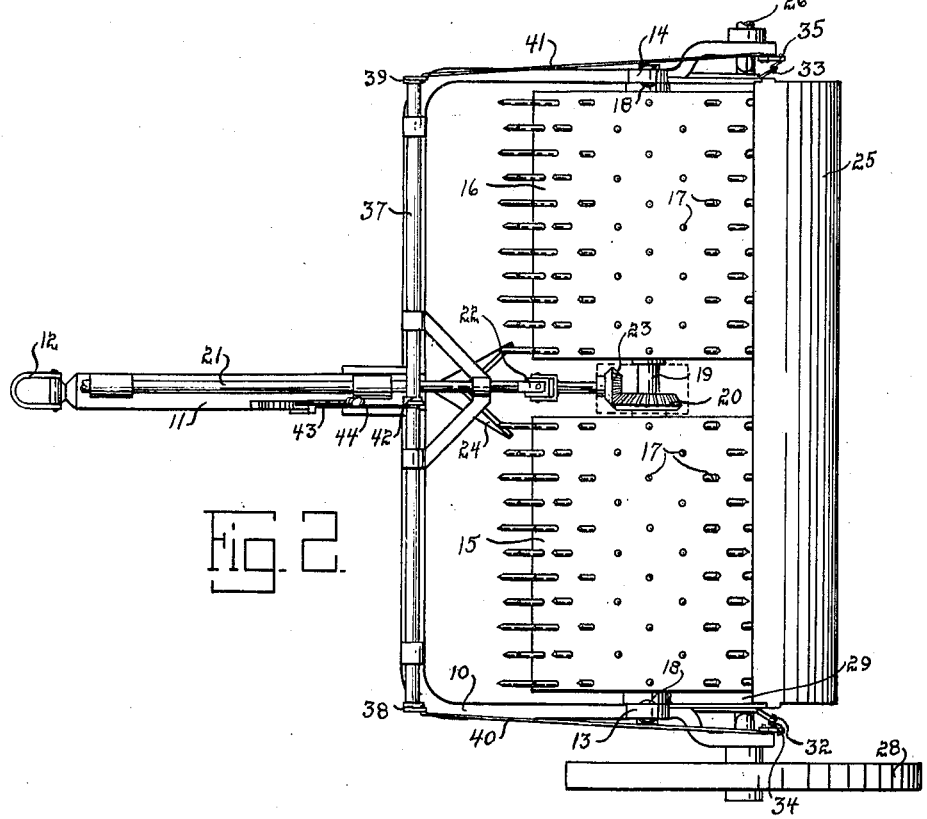
Fig. 2 is a top plan view of my earth conditioning implement more fully illustrating its construction.
Figure 3:
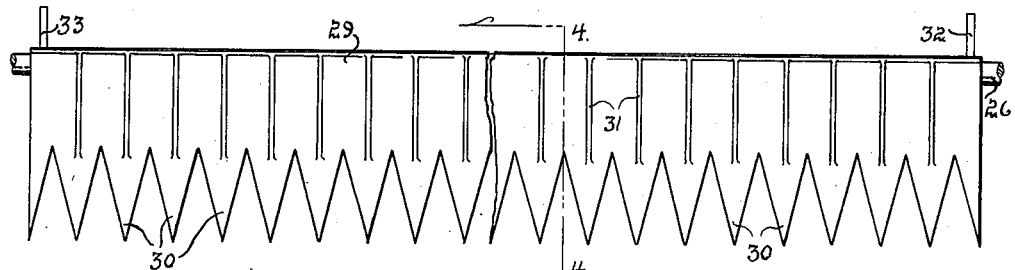
Fig. 3 is an enlarged top plan view of the earth engaging or combing bar of the device.
Figure 4:
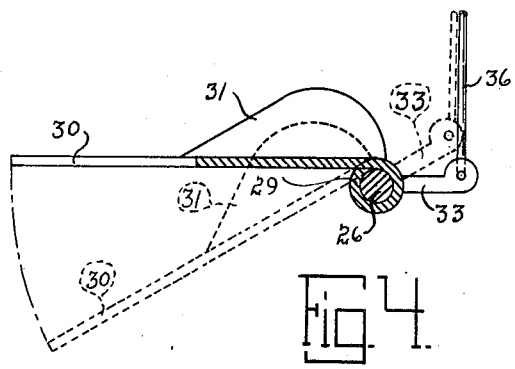
Fig. 4 is an enlarged side sectional view of the combing bar assembly taken on the line 4—4 of Fig. 3 and more fully illustrating its construction.
Figure 5:
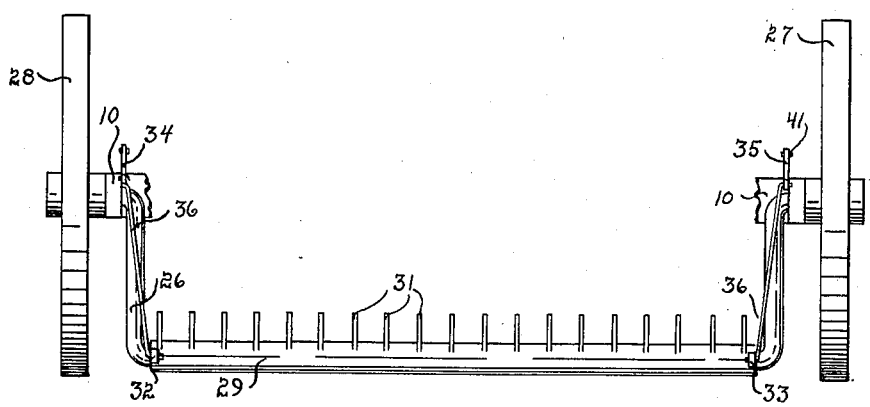
Fig. 5 is a rear elevational view of the earth engaging or combing bar suspension assembly of my device.

Referring to the drawings, I have used the numeral 10 to designate the U-shaped frame of my device having thereon the usual tongue 11 and swivel hitch 12. The numerals 13 and 14 designate bearing yokes formed adjacent the open ends of the U-shaped frame member 10. Rotatably journalled in suitable bearings within these yokes 13 and 14 are the rollers 15 and 16, each having thereon a plurality of spikes or lugs 17 as shown in the drawings. The numeral 18 designates coil springs above and below the bearing members of the rollers 15 and 16 within the bearing yokes 13 and 14, for yieldingly holding the rollers 15 and 16 in a predetermined position. These two rollers 15 and 16 are assembled rigidly to a shaft 19 to which is rigidly secured a bevel gear 20 as shown in Fig. 2 of the drawings. I have used the numeral 21 to designate a shaft rotatably mounted on the top of the tongue 11 and normally having one end in operative engagement with the power take off of the tractor or like. The numeral 22 designates a universal joint imposed in the shaft 21. I have used the numeral 23 to indicate a bevel gear rigidly secured to the other end of the shaft 21 and in operative engagement with the bevel gear 20. In practice, the gears 20 and 21 would be enclosed in a housing packed with grease in the ordinary manner. I have used the numeral 24 to designate a spreader or deflector rigidly secured to the frame 10 for spreading the dirt to either side of the opening between the rollers 15 and 16. The numeral 25 designates a shield extending across the rear and adjacent to the rollers 15 and 16 for preventing dirt packed up between the spikes 17 from being thrown from the device to the rear. I have used the numeral 26 to designate an axle extending through the end portions of the frame 10 and having rotatably mounted on its extremities, the suspension wheels 27 and 28. The central portion of the shaft 26 extends downwardly in substantially U-shape as shown in Fig. 5 of the drawings. I have used the numeral 29 to designate an earth engaging or combing bar rotatably mounted on the central portion of the shaft 26 extending forwardly and having the teeth 30 formed along its forward marginal edge as shown in the drawings. The numeral 31 designates cleaning or breaking vanes secured to the earth engaging bar 29. These vanes or plates normally rest between the spikes or projections 17, cleaning accumulated dirt or foreign matter from between the spikes when the device is in operation. The numerals 32 and 33 indicate ears secured to or formed on the rear edge of the bar 29 and extending rearwardly. The numerals 34 and 35 indicate bell cranks pivotally mounted on the ends of the frame 10. One arm of each of these bell cranks is connected to its respective lugs 32 and 33 by rods 36. The numeral 37 indicates a shaft rotatably mounted along the forward edge of the frame member 10 having crank arms 28 and 39 on each of its ends. The crank arm 38 is connected to the other end of the bell crank 34 through the medium of a rod 40 and likewise the crank 39 is connected to the other arm of the bell crank 35 of the rod 41 as shown in Fig. 2. The numeral 42 designates an arm rigidly secured to the central portion of the shaft 37. I have used the numeral 43 to designate an ordinary hand lever capable of being manually selectively located in various positions. This lever is operatively secured to the crank arm 32 by a rod 44 as shown in the drawings.

Figure 1:
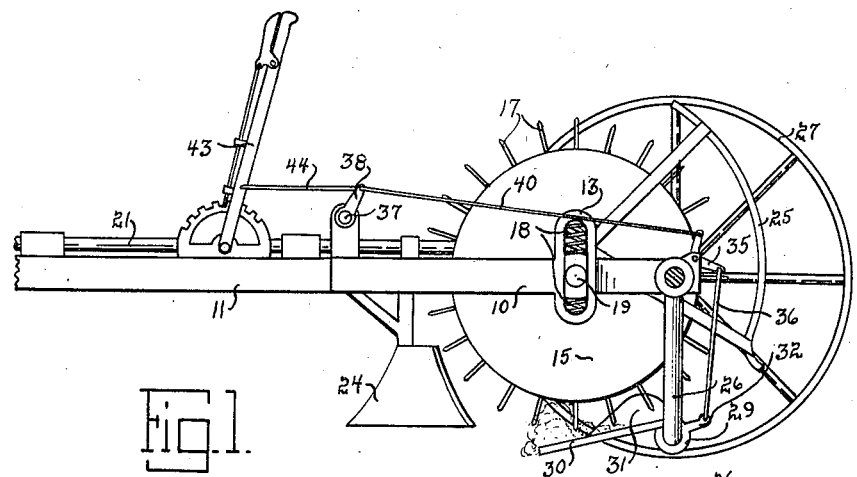
Fig. 1 is a side elevational view of my complete earth conditioning implement with one of its supporting wheels cut away.

The practical operation of my device is as follows: A tractor or like is connected to the swivel hitch 12 and the shaft 21 is placed in operative engagement with the ordinary power takeoff of the tractor and the device is ready for use. This shaft 21 rotates the bevel gear 23 which is in operative engagement with the gear 20 on the shaft 19. This rotates the drums or rollers 15 and 16 forwardly and downwardly. The hand lever 43 is set so that the combing bar 29 is in such an attitude that the teeth 30 dig into the earth the desired depth. As the device is drawn forward with the drums 15 and 16 rotating, the teeth break up all clods which might be pulled onto the combing bar 29 in the manner shown by the dotted lines in Fig. 1. The disintegrated clod or lump of earth is then pulled by the spikes back over the earth engaging bar and deposited onto the ground in a broken form. The cleaning vanes 31 aid in this operation and also clean the spaces between the teeth of any earth left hanging to the teeth or spikes 17. As the entire roller drum assembly is yieldingly suspended in the yoke 13, the rollers can give or yield with the variance of quantity of earth passing between the teeth 17 and the bar 29. Also by this arrangement, stones or the like will pass over the combing bar without injury to the device. The combing bar 29 may be tilted to any desired angle depending upon the condition of the soil and the teeth 30 may be made to bite deeply into the earth when the occasion arises.

Thus it will be seen that I have provided an earth conditioning implement which fulfills all of my objects and presents many other obvious advantages. My device compensates for variance in field conditions, is positive in its breaking action, does not require a great deal of power to operate, is fully adjustable, and is self-cleaning. Furthermore, my device leaves the field in excellent condition by uniformly breaking the clods of dirt into evenly dispersed particles and does not merely flatten or embed the clods under the surface of the earth.

Some changes may be made in the construction and arrangement of my improved earth conditioning implement without departing from the real spirit and purpose of my invention, and it is my intention to cover by my claims any modified forms of structure or use of mechanical equivalents which may be reasonably included within their scope.

I claim:

1. In an earth conditioning element, a frame member designed to be drawn by a source of tractive power, a plurality of roller elements rotatably mounted on said frame member, spikes on each of said roller elements, a means for rotating each of said roller elements, a combing bar pivotally secured to said frame member and extending forwardly below each of said roller elements, forwardly extending teeth formed in said combing bar, a means for manually pivoting said combing bar, and cleaning vanes secured at intervals along said combing bar.

2. In a device of the class described, a U-shaped frame member, wheels supporting said frame member, rollers rotatably and vertically slidably mounted adjacent the end portions of said U-shaped frame member, a resilient means for holding said rollers in one position of their sliding movement, spikes extending from said rollers, an axle secured to said frame and extending below and to the rear of said rollers, an earth engaging bar pivotally mounted along its rearward marginal edge on said axle, teeth formed on the forward marginal edge of said earth engaging bar extending adjacent said spikes on said rollers, a means for manually pivoting said earth engaging bar, and cleaning vanes formed on said earth engaging bar and extending between said spikes on said rollers.

3. In an earth conditioning implement, a U-shaped frame member, a shaft rotatably mounted in said frame member, a means for rotating said shaft, a cylindrical roller element rigidly secured to said shaft, earth engaging lugs on each of said cylindrical elements, a means for rotating said cylindrical roller elements, an adjustable earth engaging bar positioned below said rollers adjacent said lugs, and cleaning vanes formed on said earth engaging bar and extending between said lugs on said cylindrical roller element.

4. In an earth conditioning implement, a frame member designed to be drawn by a source of tractive power, a roller element rotatably mounted on said frame member, spikes on said roller element, a means for rotating said roller element, a combing bar pivotally secured to said frame member and extending forwardly below said roller element and a means for manually pivoting said combing bar at times.

PAUL C. BEEKMANN.